United States Patent [19]
Brewer et al.

[11] Patent Number: 6,167,026
[45] Date of Patent: Dec. 26, 2000

[54] PROGRAMMABLE ERROR CONTROL CIRCUIT

[75] Inventors: David Brewer, Anaheim; Hossein Hashemi, Mission Viejo; Karl M. Henson, Rancho Santa Margarita, all of Calif.

[73] Assignee: Emulex Corporation, Costa Mesa, Calif.

[21] Appl. No.: 09/071,431

[22] Filed: May 1, 1998

[51] Int. Cl.[7] .................................................. H04J 3/14
[52] U.S. Cl. ........................................... 370/222; 370/242
[58] Field of Search .................................... 370/216, 221, 370/223, 224, 222, 225, 228, 241, 242, 245, 248, 258, 453, 401; 359/110, 118, 119; 714/712, 717; 709/238, 239; 340/825.03, 827

[56] References Cited

U.S. PATENT DOCUMENTS

| | | | |
|---|---|---|---|
| 4,320,508 | 3/1982 | Takezoe | 370/222 |
| 5,229,875 | 7/1993 | Glista | 359/110 |
| 5,301,185 | 4/1994 | Cherry | 370/222 |
| 5,444,692 | 8/1995 | Basso et al. . | |
| 5,495,580 | 2/1996 | Osman . | |
| 5,522,047 | 5/1996 | Grow et al. . | |
| 5,546,378 | 8/1996 | Wirth et al. . | |
| 5,638,512 | 6/1997 | Osman et al. . | |
| 5,659,718 | 8/1997 | Osman et al. . | |
| 5,710,777 | 1/1998 | Gawne . | |
| 5,867,289 | 2/1999 | Gerstel et al. | 359/110 |

OTHER PUBLICATIONS

Fiber Channel Tutorial, http://www.fibrechannel.com/technology/tutorial.htm.
Fibre Channel Overview, http://www.cern.ch/HSI/fcs/spec/overview.htm.
Fibre Channel Glossary, http://www.iol.unh.edu/training/fc/fcglossary.html.

*Primary Examiner*—Ricky Ngo
*Attorney, Agent, or Firm*—Fish & Richardson PC

[57] ABSTRACT

In a loop network system, a method and apparatus for automatic bypass of a node port associated with a hub port when the node port generates a number of errors beyond a threshold level. In one aspect, a programmable error control circuit provides this automatic bypass. The tolerance level is set through programmable parameters including a number of errors as well as a time interval to evaluate the number of errors detected. After a node port has been bypassed by the error control circuit, the error control circuit continues to monitor the error generation of the node port. When that error generation has reached an acceptable tolerance level, the error control circuit automatically reinserts the node port into the loop. The error control circuit provides statistical reporting on the number of errors as well as the number of bypasses generated at a particular hub port.

24 Claims, 3 Drawing Sheets

PROGRAMMABLE ERROR CONTROL CIRCUIT

TECHNICAL FIELD

The present invention relates to electronic network systems, and more particularly to an error control circuit within such a network loop hub which provides automatic bypass and statistical reporting based upon programmable parameters related to error detection.

BACKGROUND OF THE INVENTION

Electronic data systems are frequently interconnected using network communication systems. Area-wide networks and channels are two approaches that have been developed for computer network architectures. Traditional networks (e.g., LAN's and WAN's) offer a great deal of flexibility and relatively large distance capabilities. Channels, such as the Enterprise System Connection (ESCON) and the Small Computer System Interface (SCSI), have been developed for high performance and reliability. Channels typically use dedicated short-distance connections between computers or between computers and peripherals.

Features of both channels and networks have been incorporated into a new network standard known as "Fibre Channel". Fibre Channel systems combine the speed and reliability of channels with the flexibility and connectivity of networks. Fibre Channel products currently can run at very high data rates, such as 266 Mbps or 1062 Mbps. These speeds are sufficient to handle quite demanding applications, such as uncompressed, full motion, high-quality video. ANSI specifications, such as X3.230-1994, define the Fibre Channel network. This specification distributes Fibre Channel functions among five layers. The five functional layers of the Fibre Channel are: FC-0—the physical media layer; FC-1—the coding and encoding layer; FC-2—the actual transport mechanism, including the framing protocol and flow control between nodes; FC-3—the common services layer; and FC-4—the upper layer protocol.

There are generally three ways to deploy a Fibre Channel network: simple point-to-point connections; arbitrated loops; and switched fabrics. The simplest topology is the point-to-point configuration, which simply connects any two Fibre Channel systems directly. Arbitrated loops are Fibre Channel ring connections that provide shared access to bandwidth via arbitration. Switched Fibre Channel networks, called "fabrics", are a form of cross-point switching.

Conventional Fibre Channel Arbitrated Loop ("FC-AL") protocols provide for loop functionality in the interconnection of devices or loop segments through node ports. However, direct interconnection of node ports is problematic in that a failure at one node port in a loop typically causes the failure of the entire loop. This difficulty is overcome in conventional Fibre Channel technology through the use of hubs. Hubs include a number of hub ports interconnected in a loop topology. Node ports are connected to hub ports, forming a star topology with the hub at the center. Hub ports which are not connected to node ports or which are connected to failed node ports are bypassed. In this way, the loop is maintained despite removal or failure of node ports.

The occurrence of errors is an inherent aspect of complex signal processing such as that involved in network systems, including loops. Due to the unavoidable nature of the occurrence of errors in such systems, methods for handling and detecting such errors in an efficient manner are desirable and have been the object of extensive research in many fields.

In general, there are two types of errors which typically arise in loop networks: transmission code errors and protocol violation errors. Transmission code errors typically include data which are not bit-wise correct or have invalid 10B codes after 8B/10B encoding (a known encoding scheme). Such errors typically arise from the loss or unintentional alteration of bits in transmission. Protocol violation errors relate to the proper sending of signals (that is, the error is not a loss of bits generated in the transmission process) which are improperly grouped or arranged according to the appropriate protocol. For example, under FC-AL protocols, the misuse of fill words in terms of timing or sequence between frames generates a protocol violation error. Under FC-AL protocols, a proper transmission sequence is typically: data, then one or more fill words (six by default), then more data. An extended stream of data alone may generate a protocol violation error.

The detection of such transmission code errors or protocol violation errors is a known process. However, the handling of errors once detected as well as the reporting of detected errors is not yet at a satisfactory state in the prior art. Conventional solutions to error handling in loop network technology typically place error handling in the devices attached to node ports, outside the hub. As a result, each device typically requires error detection and control circuitry. In addition, conventional technology typically handles detected errors with hardwired thresholds and parameters.

Conventional technology typically does not provide statistical information on the generation of errors by a node port attached to a particular hub port. As a result, in conventional hubs it is difficult to analyze systematic problems of a hub which is experiencing recurrent errors. Trial and error, typically by removal and reinsertion of node ports one at a time, is necessary to determine whether a particular node port is generating an excessive number of errors, the errors are more regularly spread, or some other problem exists.

The inventors have determined that it would be desirable to provide an error detection, handling, and reporting circuit in a hub port which would provide programmability for automatic bypass of the hub port, and statistical reporting of the generation of errors and bypasses within that hub port and its associated node port.

SUMMARY

In a loop network system, a programmable error control circuit provides automatic bypass of a node port associated with a hub port when the hub port receives a number of errors beyond a threshold level. This tolerance level is set through programmable parameters including a number of errors as well as a time interval to evaluate the number of errors detected. After a node port has been bypassed by the error control circuit, the error control circuit continues to monitor the errors received at the hub port. When that error reception has reached an acceptable tolerance level, the error control circuit automatically reinserts the node port into the loop.

In addition, the preferred embodiment provides statistical reporting on the number of errors as well as the number of bypasses generated at a particular hub port. This functionality provides for superior analytical capabilities over conventional hubs and hub ports in fibre channel arbitrated loops.

The programmable error control circuit provides several advantages over conventional hub technology: the criteria for hub port bypass may be raised or lowered through the programmability of parameters; the ability to monitor errors produced by a connected port; the ability to require an error free or variable level of error tolerance for reinsertion into the loop. The programmable error threshold allows flexibility in determining when an attached node port should be bypassed. In addition, the statistical reporting provided by the preferred embodiment provides valuable information. This statistical information allows for easy detection of ports which are problematic in the number of errors they are injecting into the loop.

DETAILED DESCRIPTION

The preferred embodiment provides a mechanism to automatically bypass a node port or loop segment attached to a hub port, where the node port or loop segment has generated a number of errors exceeding a programmable threshold level. The invention is explained below in the context of a Fibre Channel Arbitrated Loop ("FC-AL") as an illustration of the preferred embodiment. However, the invention may have applicability to networks with similar characteristics as FC-AL networks.

Figure 1:
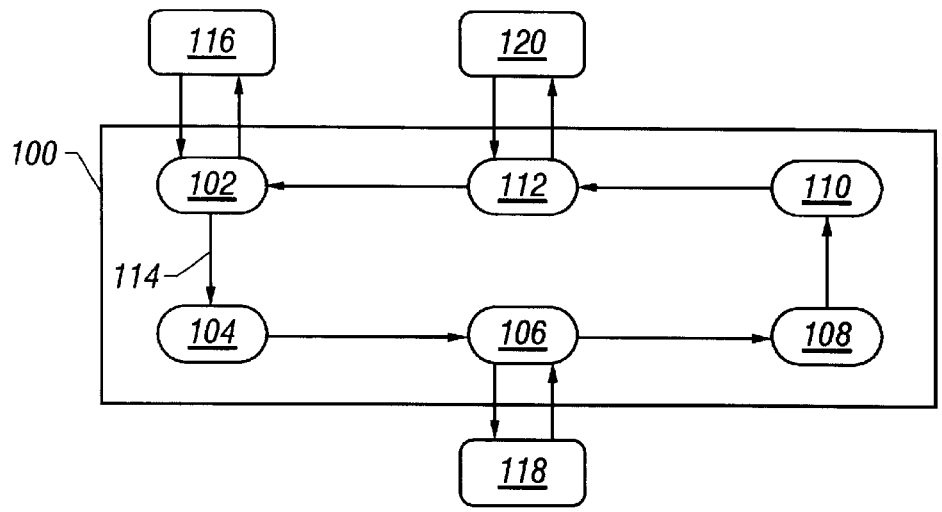
FIG. 1 shows a prior art FC-AL configuration.

FIG. 1 illustrates a conventional FC-AL architecture with node ports attached to hub ports of a hub. In FIG. 1, hub 100 has six hub ports 102–112. While only six hub ports are illustrated in FIG. 1, the number of hub ports is used as an example and is not a limitation upon the capabilities of the preferred embodiment.

Hub ports 102, 104, 106, 108, 110, 112 are interconnected by internal hub links of a hub loop 114. Attached to three hub ports 102, 106, 112 are three node ports 116, 118, 120, respectively. In this way a loop topology is maintained through hub 100 and then, in effect a virtual loop topology is maintained for node ports 116–120. Each node port represents a connection to an operational device, such as an NL_Port, or to a loop segment. In addition to devices, a hub port may be connected to a hub port on another hub. In this way, devices and hubs may be chained together to form a loop of any size from two devices to whatever physical resources allow.

The preferred embodiment provides error detection and handling functionality for a hub port and its associated node port. A node port connected to a hub port according to the preferred embodiment is illustrated in more detail in FIG. 2. The configuration shown in FIG. 2 is similar to the node port-hub port relationships shown in FIG. 1, such as node port 120 and hub port 112.

Figure 2:
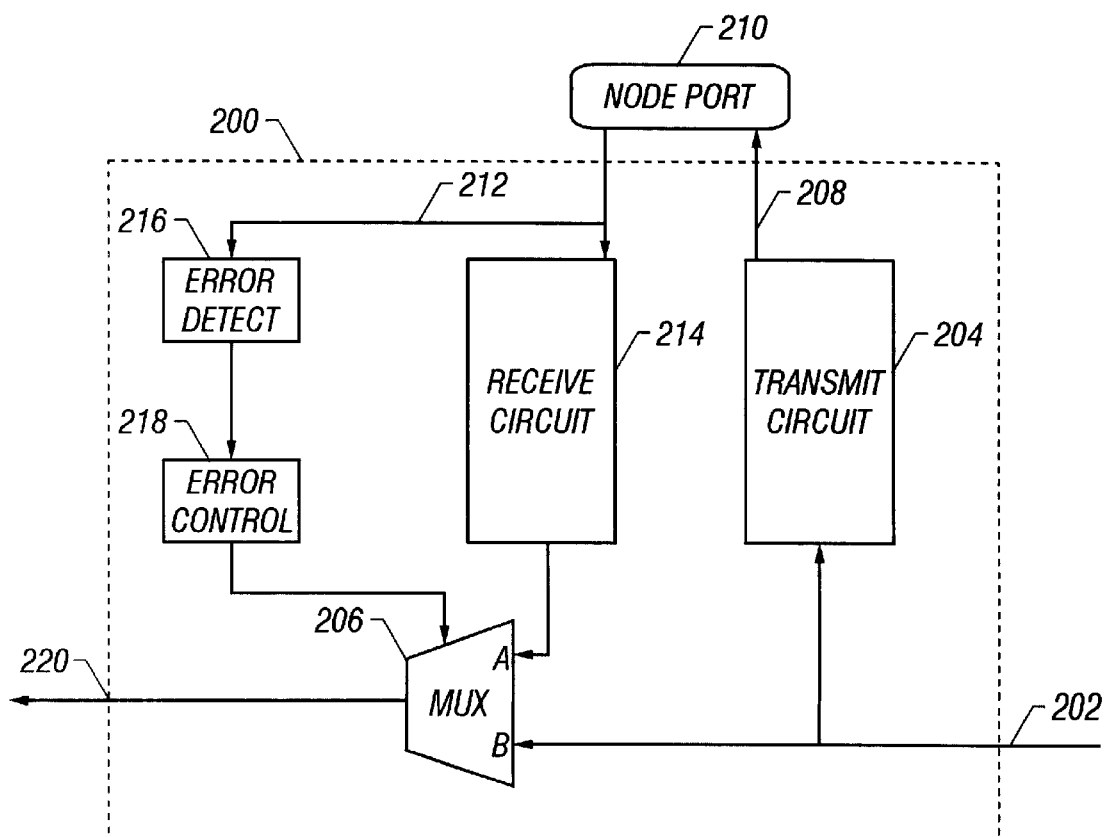
FIG. 2 shows a block diagram of a hub port of the preferred embodiment.

In FIG. 2, an incoming internal hub link 202 enters hub port 200. Incoming internal hub link 202 represents a connection between hub port 200 and an upstream (i.e., preceding in the loop) hub port (not shown) in the loop of the hub. Similarly, an outgoing internal hub link 220 (described below) exits hub port 200 to connect hub port 200 to a downstream hub port in the hub loop. Incoming internal hub link 202 is connected to a hub port transmit circuit 204 and a switching device 206, such as a multiplexer. As a result, data sent on incoming internal hub link 202 from the previous hub port to hub port 200 is input to hub port transmit circuit 204 regardless of the operation of switching device 206. Hub port transmit circuit 204 is connected to a node port 210 by a data channel 208. Hub port transmit circuit 204 preferably converts data into a form usable by node port 210. In this way, data flows from incoming internal hub link segment 202 to hub port transmit circuit 204, then through data channel 208 to node port 210. Node port 210 supplies data to its attached device (not shown) as appropriate according to the functionality of the attached device.

Data from node port 210 to be sent back onto the loop flows through a data channel 212 and into a hub port receive circuit 214 as well as an error detect circuit 216. Hub port receive circuit 214 converts data into a form usable inside the hub. Output signals from error detect circuit 216 enter an error control circuit 218. Error control circuit 218 has incoming data channels (not shown) to set programmable parameters of error control circuit 218. In addition, error control circuit 218 has outgoing data channels (not shown) to indicate statistical reporting of errors as well as the number of bypasses implemented by error control circuit 218. Alternatively, hub port receive circuit 214, error detect circuit 216, and error control circuit 218 may be included in a single circuit.

Hub port receive circuit 214 outputs data to a first input of switching device 206. A second input of switching device 206 is connected to incoming internal hub link 202. The of which input flows out of switching device 206 is controlled by error control circuit 218. Error detect circuit 216 outputs error detection signals indicating the presence of errors in data received from node port 210, as conventionally detected, to error control circuit 218. Error control circuit 218 operates according to the supplied programmable parameters. When appropriate, error control circuit 218 sets switching device 206 to bypass the output of hub port receive circuit 214 (and hence the output of node port 210) and pass along the data on incoming internal hub link 202. The output of switching device 206 is connected to outgoing internal hub link 220 which is in turn connected to the succeeding hub port (not shown) in the hub loop.

The preferred embodiment makes use of programmable values and counters to determine when a tolerance threshold for errors within a certain time period has been exceeded. Upon determining that error threshold has been violated, the error control circuit (shown as error control circuit 218 in FIG. 2) generates a bypass signal and causes the hub port to enter a bypass mode so that the output relayed from the error generating node port is not output onto the hub loop. Instead, the data received by the hub port from the previous hub port is passed along to the next hub port.

The programmable parameters used in the preferred embodiment include: a subinterval value, an interval value, an error value, and a tolerance value. One or more of these values may be hardwired (i.e., not programmable) in a particular embodiment. The subinterval value preferably represents the number of microseconds in a subinterval. The interval value represents the number of subintervals which make up one interval.

The error value represents a threshold for a number of subintervals containing errors which when detected during a single interval cause the hub port to enter a bypass mode. The number of subintervals during which an error occurred is counted and compared against the error value. The detection of more than one error during a particular subinterval preferably does not cause a different result in the bypass decision than that of detecting one error during that subinterval. If the error value is reached or exceeded by the number of subintervals which contain errors during a particular interval, then the error control circuit sets a bypass flag so that the hub port shifts into bypass mode.

The tolerance value represents the maximum number of subintervals containing errors which may be received during an interval to allow reinsertion of the node port into the hub loop. The tolerance level, similar to the error value, allows for a number of subintervals which contain errors as opposed to an absolute number of errors occurring during a particular interval.

In the preferred embodiment, the subinterval value is 24 microseconds. This number is especially preferred because of the one gigabit per second nature of the data rates on a conventional FC-AL network. The tolerance value is preferably set to zero. As a result, a node port is not reinserted into the hub loop until one entire interval has passed without an error occurring during any subintervals.

Figure 3:
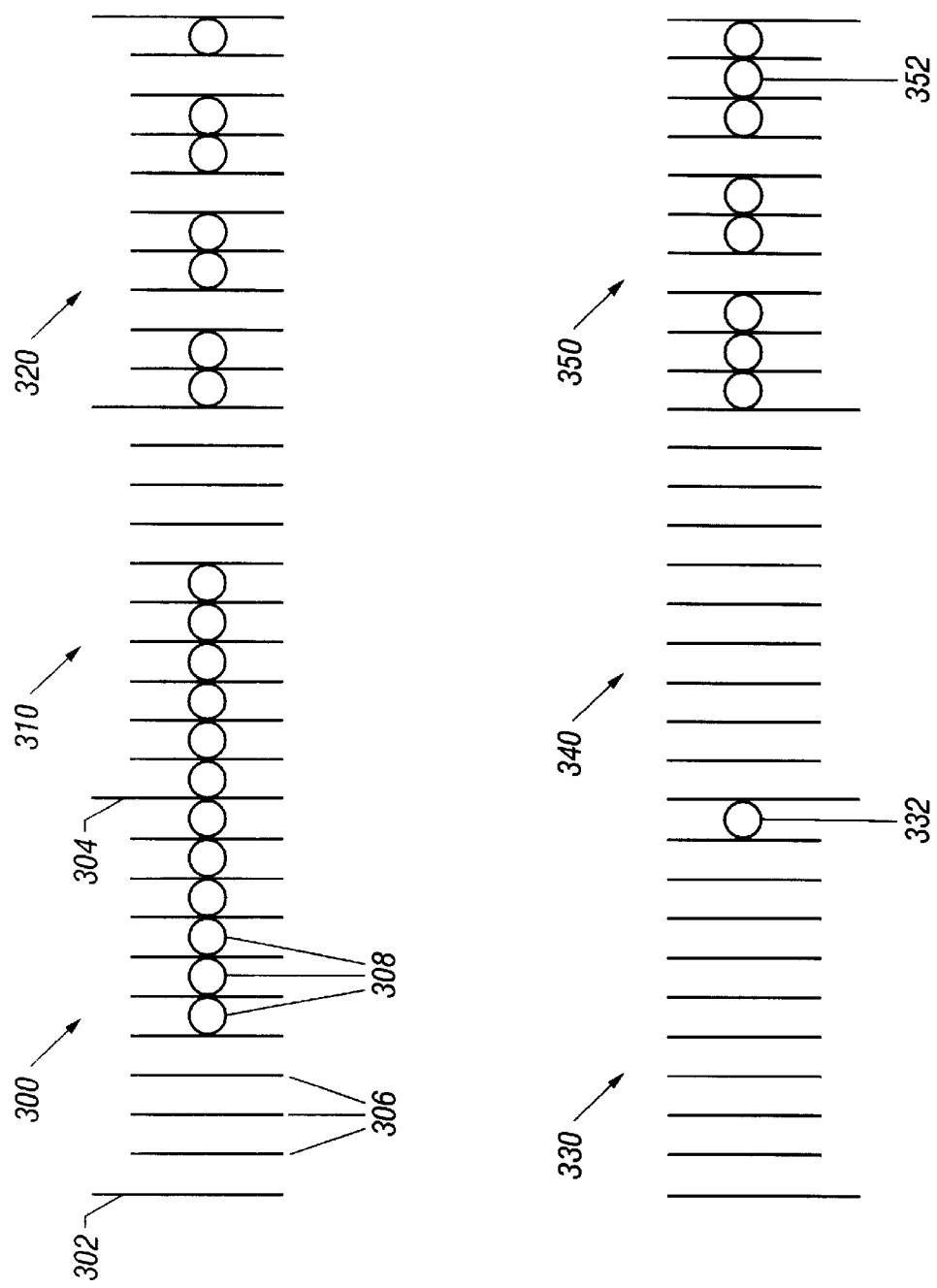
FIG. 3 shows an example of error generation detected by a hub port of the preferred embodiment.

An overview of the error detection, removal, and reinsertion process according to the preferred embodiment is illustrated in FIG. 3. A first interval 300 is demarcated in FIG. 3 by lines 302 and 304. Interval 300 is divided into ten subintervals (i.e., the interval value is 10). If, as described above, a subinterval is equal to approximately 24 microseconds (as determined by the subinterval value), interval 300 lasts approximately 240 microseconds. FIG. 3 illustrates a series of six intervals 300, 310, 320, 330, 340, 350.

In interval 300 an error occurring in a subinterval is indicated by a circle 308, as shown in subinterval 306. A circle 308 in a subinterval 306 indicates the detection of one or more errors during the time period of a subinterval. If in the situation illustrated in FIG. 3 the error value is set to 7, the subinterval value is set to approximately 24 microseconds, the interval value is set to 10, and the tolerance value is set to 0, then the error control circuit does not generate a bypass flag during the first interval. Only six subintervals of the ten subintervals in the first interval 300 include errors, indicated by circles such as circle 308. Because the error value is set to 7, the number of subintervals containing errors is less than the error value and so a bypass flag is not set.

Similarly, in the second interval 310, the bypass flag is not set because only six subintervals contain errors. Note that the division of subintervals into intervals allows for a constant stream of subintervals with errors which taken as a group would exceed the error value, but due to the regulated nature imposed by the interval value, the bypass flag may not be set. As shown in FIG. 3, while interval 300 contain six subintervals with errors and interval 310 includes six subintervals with errors, neither interval 300, 310 causes the bypass flag to be set. However, the six subintervals with errors in interval 300 and the six subintervals with errors in interval 310 are consecutive. Thus, there are 12 consecutive subintervals with errors which do not set the bypass flag. This is desirable due to the averaged nature of the number of errors over time. The use of an interval value and error value regulates the overall error tolerance of a hub port in the preferred embodiment.

In contrast to intervals 300 and 310, a third interval 320 contains seven subintervals which contain at least one error. As a result, the error control circuit sets the bypass flag during interval 320. After setting the bypass flag, the node port associated with the hub port is removed from the loop by the hub port going into bypass mode.

The node port remains bypassed until the error control circuit determines that the number of subintervals containing errors during an interval is equal to or less than the tolerance value. As mentioned above, the tolerance value for the situation illustrated in FIG. 3 is assumed to be set to zero. Thus, in interval 330, the node port is not reinserted and the bypass flag remains set because one subinterval contains an error. The tolerance value is zero and so the bypass flag remains set. In interval 340, however, there are no subintervals containing errors and so the bypass flag is cleared. The node port is reinserted into the loop. At this point, appropriate measures are taken to reinsert the node port into the loop.

The sixth interval 350 shows that eight subintervals contain errors. The illustration in FIG.3 for interval 350 shows the detection of errors across the interval demarcated by interval 350. However, in the preferred embodiment, the bypass flag of the error control circuit in the preferred embodiment is set upon detection of a number of subinterval containing errors which is equal to the error value. As a result, the bypass flag is set in interval 350 during the ninth subinterval 352. Additional subintervals containing errors after a subinterval which causes the bypass flag to be set preferably do not alter the bypass decision. However, the number of errors continues to be counted in order to calculate statistical information about the error performance of the associated node port. In an alternative embodiment, the bypass flag may only be set at the completion of an interval.

Figure 4:
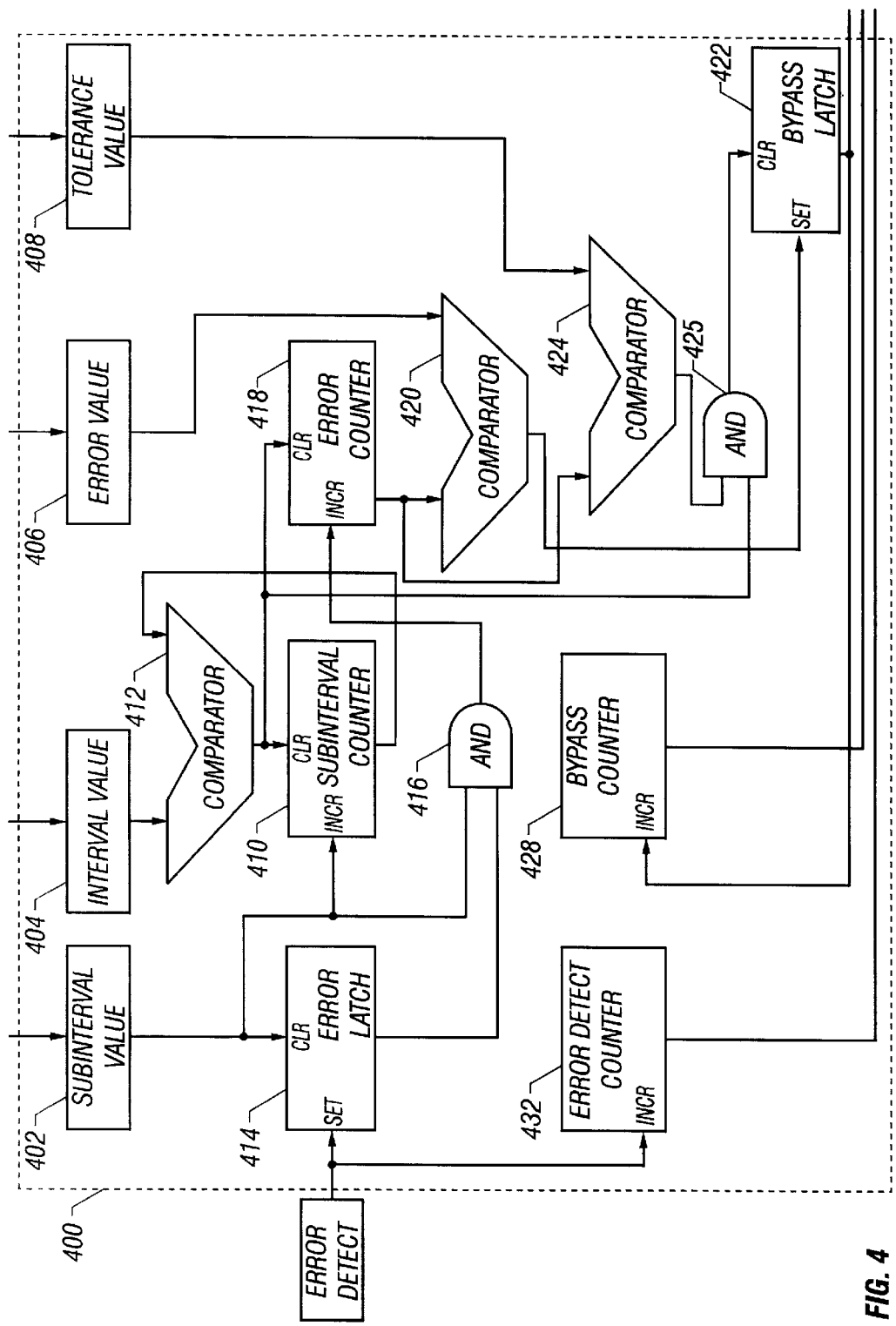
FIG. 4 shows a block diagram of an error control circuit of the preferred embodiment.

The internal components of an error control circuit of the preferred embodiment (shown as error control circuit 218 in FIG. 2) are illustrated in more detail in FIG. 4. Error control circuit 400 includes four circuits which store the programmable parameters discussed above: a subinterval value circuit 402, an interval value circuit 404, an error value circuit 406 and a tolerance value circuit 408. In response to a clock signal, subinterval value circuit 402 which stores the subinterval value generates a pulse on its output line at the rising edge of the clock pulse which is outside the time defined by the subinterval value. For example, if the clock were running at one pulse per microsecond, subinterval value circuit 402 would generate a pulse at the 1st clock pulse, the 25th clock pulse, the 49th clock pulse, etc. The output of subinterval value circuit 402 is connected to an increment input of a subinterval counter 410. Each pulse generated by subinterval value circuit 402 increments the value stored in subinterval counter 410. Thus, subinterval counter 410 counts the number of subintervals as defined by the subinterval value. The output of subinterval value counter 410 is input to a first input of a comparator 412. The second input of comparator 412 is connected to an output of interval value circuit 404. The output of interval value circuit 404 is the value of the interval value. Thus, comparator 412 compares the interval value with the output of subinterval counter 410 (i.e., the number of subintervals which have elapsed).

Error detect circuit 216 (from FIG. 2) sends an error detect flag to an error detect latch 414 upon detecting an error in the data from the node port (node port 210 in FIG. 2). Error detect latch 414 is set upon receiving an error detect flag from error detect circuit 216. The output of subinterval value circuit 402 is also input to a clear input of error detect latch 414. In this way, error detect latch 414 is cleared at the beginning of each subinterval. This clear functionality allows error detect latch 414 to be set once for each subinterval upon detection of an error during that subinterval. Additional error flags received by error detect latch 414 from error detect circuit 216 before error detect latch has been cleared (i.e., during the same subinterval) do not affect the output of error detect latch 414. Error detect latch 414 is cleared at the beginning of a new subinterval by the output of a pulse from subinterval value circuit 402.

The output of error detect latch 414 and the output of subinterval value circuit 402 are both input to an AND gate 416. The output of AND gate 416 is input to an increment input of an error counter 418. In this way, error counter 418 is incremented for each subinterval which also has a detected error contained therein. The output of error counter 418 is input to a first input of a second comparator 420. A second input of comparator 420 is connected to the output of error value circuit 406. Error value circuit 406 outputs a value equal to the error value. Thus, comparator 420 compares the error value to the output of error counter 418. The output of comparator 420 is input to a set input of a port bypass enable latch 422. In this way, if error counter 418 outputs a value representing a number of subintervals containing errors within an interval equal to the value contained in error value circuit 406, the port bypass enable latch 422 is set and a bypass flag is set.

The output of the first comparator 412 is input to a clear input of subinterval counter 410. In this way when subinterval counter 410 outputs a value indicating that the number of subintervals which have elapsed is equal to the value of the interval value, the interval has expired and so subinterval counter 410 is cleared. In addition, the output of comparator 412 is input to a clear input of error counter 418. In this way, when an interval has expired, as represented by the number of subintervals being equal to the interval value, the error counter is reset to begin counting the number of subintervals containing errors in the new interval.

The output of error counter 418 is also input to a first input of a third comparator 424. A second input of comparator 424 is connected to the output of tolerance value circuit 408. Thus, comparator 424 compares the value of the tolerance value and the output of the error counter 418. The output of comparator 424 is input to a second AND gate 425. The output of comparator 412 is also input to AND gate 425. The output of AND gate 425 is connected to a clear input of port bypass enable latch 422. In this way, at the end of an interval, as represented by equality of the interval value and the output of subinterval counter 410, if the number of errors is equal to or less than the tolerance value, as shown by the output of error counter 418 being equal to or less than the output of tolerance value circuit 408 as determined by comparator 424, then both the inputs of AND gate 424 are positive. Hence, the output of AND gate 424 clears port bypass enable latch 422 when the number of subintervals containing errors during a single interval is equal to or less than the tolerance value.

The output of port bypass enable latch 422 is connected to a port bypass line 426 which represents the bypass flag discussed above. Port bypass line 426 is an output of error control circuit 400 and connects to switching device 206 shown in FIG. 2.

The output of port bypass enable latch 422 is also connected to an increment input of a bypass counter 428. In the preferred embodiment, bypass counter 428 counts the number of times that the port bypass enable latch switches form zero to one because the increment input is edge sensitive. Alternatively, if the increment input of bypass counter 428 is level sensitive, the bypass counter may count the number of periods for which the bypass flag is set as determined in relation to a clock rate and alternative predetermined values supplied according to the needs of the embodiment. In the preferred embodiment, the output of bypass counter 428 is connected to a bypass count line 430. Bypass count line 430 is an output of error control circuit and is available for external statistical analysis of the error performance of the hub port.

The output of error detect circuit 216 is also input to an error detect counter 432. Depending upon the level sensitive or edge sensitive nature of the increment and the operation of the error detect circuit 216, error detect counter 432 may determine the absolute number of errors as they are detected or it may determine the number of errors for a particular time period as defined by supplied values. In the preferred embodiment, error detect counter 432 is incremented each time an error is detected by the error detect circuit 216. Error detect counter 432 outputs a number representing the number of errors so far detected at this error control circuit 400. The output of error detect counter 432 is connected to an error count line 434. Error count line 434 is also available for external statistical analysis of the error performance of the node port and hub port.

In addition, the counters and latches throughout the error control circuit also have inputs for clock and write enable as appropriate (not shown) to properly control components as will be understood by one of ordinary skill in the art.

In an alternative embodiment, a hub has a bypass counter and an error detect counter for statistical recording for the hub as a whole, rather than, or in addition to, individual hub ports. These counters could be implemented to receive output from the counters in error control circuits of hub ports or could receive signals directly from the error detect circuits and port bypass enable latches.

The preferred embodiment provides a mechanism to remove a node port generating errors beyond a desired threshold from a hub loop. A certain amount of error tolerance is generally desirable to prevent a port bypass upon reception of an insignificant number of errors during a given time period. Because "insignificant" is a relative term, depending upon the nature of the application, a method of adjustment or programmability for the error threshold is desirable. The recording of errors and port bypasses provides for an intelligent adjustment of the interval value, error value, and subinterval value based upon the previous performance of the attached node port.

The invention has been described in terms of a preferred embodiment along with several alternative embodiments, however, it should be understood that the scope of the invention is not to be limited by the description provided herein but rather only by the scope of the following claims. Alternative embodiments which fall within the scope of the claims will also be apparent to those of ordinary skill in the art.

What is claimed is:

1. A hub including a plurality of hub ports for connecting node ports to the hub, each hub port comprising:
   (a) a hub data source for supplying data from a loop network to the hub port; and
   (b) an error control circuit connected to a node port attached to the hub port and to the hub data source, where the error control circuit outputs data from the attached node port to the loop network, and further where the error control circuit bypasses the node port and outputs data from the hub data source to the loop network upon detecting a number of errors in data from the node port exceeding a programmable threshold.

2. A hub including a plurality of hub ports for connecting node ports to the hub, each hub port comprising:
   (a) a switching device, including a first input, a second input, and a control input;
   (b) a hub data source connected to the first input of the switching device;
   (c) a node data source connected to the second input of the switching device; and (d) an error control circuit connected to the node data source and to the control input of the switching device.

3. The hub of claim 2 where the error control circuit is programmable.

4. The hub of claim 2 where the error control circuit comprises an error detect circuit.

5. A hub port in a hub, the hub port comprising:
- a switching device, including a first input, a second input, and a control input;
- a hub data source connected to the first input of the switching device;
- a node data source connected to the second input of the switching device;
- an error control circuit connected to the node data source and to the control input of the switching device;
- at least one value circuit, where each value circuit is connected to a corresponding programmable parameter input line;
- a counter which increments in response to signals from the error detect circuit; and
- a port bypass enable latch which is set or cleared in response to the counter and at least one value circuit.

6. The hub of claim 2 further comprising a bypass counter which increments in response to the error control circuit.

7. The hub of claim 2 further comprising an error counter which increments in response to the error detect circuit.

8. The hub of claim 2 where the hub is in a Fibre Channel Arbitrated Loop network.

9. A hub including a plurality of hub ports for connecting node ports to the hub, each hub port comprising:
 (a) a switching device, including a first input, a second input, and a control input;
 (b) a hub data source connected to the first input of the switching device;
 (c) a node data source connected to the second input of the switching device;
 (d) an error detect circuit connected to the node data source; and
 (e) an error control circuit connected to the error detect circuit and to the control input of the switching device.

10. The hub of claim 9 where the error control circuit is programmable.

11. A hub in a loop network, said hub comprising:
a plurality of hub ports, each hub port comprising:
 (a) a switching device including a first input, a second input, and a control input;
 (b) a transmit circuit connected to a node in the loop network;
 (c) a receive circuit connected to the node and to the first input of the switching device;
 (d) an error detect circuit connected to the node;
 (e) an error control circuit connected to the error detect circuit and the control input of the switching device, where the error control circuit includes at least one programmable parameter input line;
 (f) an incoming internal hub link connected to the second input of the switching device and to the transmit circuit; and
 (g) an outgoing internal hub link connected to the switching device.

12. The hub of claim 11 further comprising a port bypass enable latch connected to the error control circuit.

13. A hub port for connecting a node to a hub in a loop network, comprising:
a switching device including a first input, a second input, and a control input;
a transmit circuit connected to the node;
a receive circuit connected to the node and to the first input of the switching device;
an error detect circuit connected to the node;
an error control circuit connected to the error detect circuit and the control input of the switching device, where the error control circuit includes at least one programmable parameter input line;
an incoming internal hub link connected to the second input of the switching device and to the transmit circuit;
an outgoing internal hub link connected to the switching device;
at least one value circuit, where at least one value circuit is connected to a corresponding programmable parameter input line;
a counter which increments in response to signals from the error detect circuit; and
a port bypass enable latch which is set or cleared in response to the counter and at least one value circuit.

14. The hub of claim 11 further comprising a bypass counter which increments in response to the error control circuit.

15. The hub of claim 11 further comprising an error counter which increments in response to the error detect circuit.

16. A hub including a plurality of hub ports for connecting node ports to the hub, where each hub port comprises:
 (a) a switching device;
 (b) an error detect circuit;
 (c) an error control circuit connected to the switching device and the error detect circuit;
 (d) a hub data channel connected to the switching device; and
 (e) a node port data channel connected to the error detect circuit.

17. The hub of claim 16 where an error control circuit comprises:
 (a) an interval value input line;
 (b) an error value line;
 (c) a tolerance value line;
 (d) an error counter which is incremented in response to the error detect circuit, and is cleared in response to a comparison of the interval value line and elapsed time; and
 (e) a port bypass enable latch which is set in response to a comparison of output of the error counter and the error value line, and is cleared in response to a comparison of output of the error counter and the tolerance value line.

18. The hub of claim 16 further comprising at least one error counter which increments in response to at least one error detect circuit.

19. The hub of claim 16 further comprising at least one bypass counter which increments in response to at least one error control circuit.

20. In a hub comprising a plurality of hub ports, a method for bypassing a hub port connected to a node port in loop network, the method comprising:
 (a) receiving data from the node port;
 (b) detecting any errors in the data at the hub port;
 (c) counting the number of detected errors;

(d) determining if the number of detected errors exceeds a threshold; and (e) bypassing the hub port in response to that determination.

21. The method of claim 20 where determining if the number of detected errors exceeds the threshold is based on the number of detected errors, an error value, and a time value.

22. The method of claim 20 further comprising:

(a) determining if the number of detected errors is below a tolerance level; and (b) ending the bypass of the hub port in response to if the number of detected errors is below the tolerance level.

23. A system comprising:

a hub including a plurality of hub ports, each hub port being connected to a node port in a loop network;

means for receiving data from the node port;

means for detecting any errors in the data;

means for counting the number of detected errors;

means for determining if the number of detected errors exceeds a threshold; and means for bypassing the hub port in response to that determination.

24. The system of claim 23 further comprising:

(a) means for determining if the number of detected errors is below a tolerance level; and (b) means for ending the bypass of the hub port in response to if the number of detected errors is below the tolerance level.

* * * * *